United States Patent [19]

Karlsson

[11] 4,217,235
[45] Aug. 12, 1980

[54] PROCESS FOR THE SELECTIVE EXTRACTION OF METAL CATIONS FROM AQUEOUS SOLUTIONS THEREOF AND COMPOSITIONS

[75] Inventor: Bengt G. Karlsson, Stenungsund, Sweden

[73] Assignee: Berol Kemi AB, Stenungsund, Sweden

[21] Appl. No.: 923,121

[22] Filed: Jul. 10, 1978

[30] Foreign Application Priority Data

Jul. 11, 1977 [SE] Sweden .................................. 7708033

[51] Int. Cl.$^2$ .............................................. C02C 5/02
[52] U.S. Cl. ..................................... 252/184; 210/59; 210/65; 210/73 R; 210/83; 260/570.9
[58] Field of Search ................... 252/184; 210/59, 65, 210/73 R, 83; 260/570.9, 570.5 P

[56] References Cited

U.S. PATENT DOCUMENTS

| | | | |
|---|---|---|---|
| 2,750,416 | 6/1956 | Exner et al. | 260/570.9 |
| 2,882,319 | 4/1959 | Hotelling et al. | 260/570.9 |
| 3,297,597 | 1/1967 | Edwards | 260/570.9 |
| 3,725,266 | 4/1973 | Haviland | 210/73 R |
| 3,979,361 | 9/1976 | Schultz | 260/570.9 |
| 4,128,493 | 12/1978 | MacKory et al. | 252/184 |

*Primary Examiner*—Benjamin R. Padgett
*Assistant Examiner*—Irwin Gluck

[57] ABSTRACT

A process and composition are provided for the selective extraction of metal cations from aqueous solutions thereof, utilizing a water-immiscible solution in an organic solvent of an ortho-N-substituted aminomethyl phenol.

29 Claims, No Drawings

PROCESS FOR THE SELECTIVE EXTRACTION OF METAL CATIONS FROM AQUEOUS SOLUTIONS THEREOF AND COMPOSITIONS

Disposal of aqueous solutions containing toxic metal cations poses some serious problems today. Such solutions can no longer be dumped without violating environmental protection laws. However, the separation of the metal cations from the aqueous solutions is costly and difficult.

For example, there is a considerable amount of lead and other metals in the particles entrained in flue gas vented from steel mills. If the flue gas is vented to the atmosphere, and the lead-containing particles deposited on the ground, there is a serious pollution problem. Extraction of the flue gas particles by leaching, followed by extraction of the lead cation content of the leaching solution, is difficult to carry out, because of the difficulty in selectively separating lead ions from other metal ions.

Metal pickling baths usually contain large amounts of iron chloride, which is an excellent precipitating reagent. However, lead is also extracted into the pickling bath, which then presents a disposal problem. Acid solutions from lead accumulators also contain large amounts of lead, which makes their disposition difficult.

Cadmium is another toxic metal which in very small concentrations is extremely poisonous. Consequently, it is important to recover cadmium from cadmium-containing waste solutions such as metal surface etching and cleaning baths, and salt solutions from accumulators.

In the recovery of metals from ores, the ore is frequently crushed and ground, and then leached, in order to extract the metal values as an aqueous solution. The metal values are then recovered from the aqueous solutions by extraction. Partially oxidized sulfide ores of copper, zinc and lead are advantageously treated in this manner. However, it is rather difficult to selectively separate copper, zinc and lead from their aqueous solutions.

These examples are only a small proportion of the cases where a good selective separation of metals by extraction would be useful.

In accordance with the present invention, a process for selectively extracting metal ions is provided, which overcomes many of the difficulties of prior processes. In the process of the invention, an aqueous solution of the metal cations to be separated is extracted with a solution in a water-immiscible organic solvent of an ortho-N-substituted aminomethyl phenol which is insoluble in the aqueous solution. These phenols contain the active grouping:

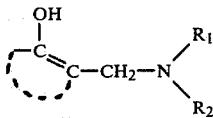

In the above formula, the two carbon atoms within the dashed ring represent part of an aromatic carbocyclic ring, such as a benzene, indene, acenaphthene, naphthalene, anthracene or phenanthrene ring;

$R_1$ and $R_2$ are selected from the group consisting of hydrogen (preferably no more than one of $R_1$ and $R_2$ being hydrogen) and hydrocarbon groups having from one to about twelve carbon atoms and including monovalent hydrocarbon groups, and bivalent hydrocarbon groups having from about four to about twelve carbon atoms, in which $R_1$ and $R_2$ are taken together with the nitrogen to form a heterocyclic ring having from five to about thirteen ring atoms.

A particularly preferred class of ortho aminomethyl phenols falling within the above group are the monocyclic phenols having the formula:

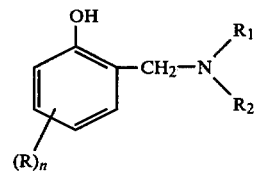

In the above formula, $R_1$ and $R_2$ are as above, each R is a hydrocarbon group having from one to about twenty-four carbon atoms; and n is a number from 0 to 4.

These compounds have the ability to selectively extract many toxic polyvalent metal cations from aqueous solutions thereof. The mechanism for this extractive capability is not known, but it is believed that the hydroxyl group and the amino nitrogen may link with the metal cation to form a chelate or complex, possibly including the cation as one ring atom of a six-membered ring.

It further appears that the extractive capability of such phenols for various metal cations can be varied by varying the groups $R_1$ and $R_2$, so that it is possible to improve the selectivity for certain metal cations, and reduce it for others, by such variation. The change in the extractive effect can be explained as possibly due to steric hindrance imposed by the substituents on the nitrogen atom, which further suggests that the nitrogen atom becomes bound to the metal cation in some way.

It is also important that $R_1$ and $R_2$ groups not contain another group in addition to the hydroxyl and the nitrogen atom, which is capable of complexing or chelating with the metal cation. Thus, if the $R_1$ and $R_2$ substituents include an amino nitrogen atom or a hydroxyl group, the extractive capability is seriously impaired, if not lost altogether.

Certain compounds within the general class set forth above are believed to be novel. These are the 2-N-substituted-aminomethyl-4,6-hydrocarbon-substituted phenols having the general formula:

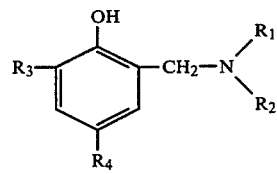

In the above formula, $R_1$ and $R_2$ are as above, and $R_3$ and $R_4$ in the 4- and 6-positions, respectively, are selected from the group consisting of hydrogen and hydrocarbon groups having from one to about forty carbon atoms, the total number of carbon atoms in the hydrocarbon groups $R_3$ and $R_4$ being within the range from about eight to about forty.

Illustrative hydrocarbon groups from which R, $R_1$, $R_2$, $R_3$ and $R_4$ can be selected according to their number of carbon atoms include methyl, ethyl, n-propyl, isopropyl, n-butyl, isobutyl, secondary butyl, amyl, isoamyl, tertiary amyl, hexyl, octyl, 2-ethylhexyl, isooctyl, nonyl, isononyl, decyl, dodecyl, tetradecyl, hexadecyl, octadecyl, behenyl and eicosyl, as well as cyclic hydrocarbon groups such as cyclohexyl, cyclopentyl, cycloheptyl, cyclooctyl, cyclobutyl and cyclopropyl.

$R_1$ and $R_2$ may also be taken together with the nitrogen to form a heterocyclic ring, in which the amino nitrogen is one ring atom, and $R_1$ and $R_2$ supply the remaining ring atoms, the ring including from five to thirteen ring atoms. Such heterocyclic rings can bear alkyl groups having from one to about six carbon atoms, such as, for example, a pyrrolidine ring, a piperidine ring, a tetrahydroindole ring, a tetrahydroquinoline ring, and a tetrahydrocarbazole ring, the alkyl including methyl, ethyl, propyl, isopropyl, butyl, isobutyl, amyl and hexyl.

It will be apparent that when no more than one of $R_1$ and $R_2$ is hydrogen, the nitrogen atom is either secondary or tertiary, and preferably it is tertiary, i.e., both $R_1$ and $R_2$ are hydrocarbon groups selected from the classes indicated.

Preferably, $R_3$ and $R_4$ are alkyl groups having at least four carbon atoms. Exemplary are butyl, hexyl, octyl, nonyl, dodecyl, hexadecyl, and isomers thereof, such as isobutyl, tertiary butyl, isoheptyl, isooctyl 2-ethyl hexyl, isononyl and isododecyl.

These phenols can be prepared by a Mannich reaction from formaldehyde and the corresponding phenol and amine. An aminomethyl phenol is obtained when these reagents are reacted at a temperature below about 100° C., in a molar ratio of about one mole of the phenol, from one to two moles of formaldehyde, and from 1 to 2.5 moles of the amine. Paraformaldehyde can be used as a source of formaldehyde, since in the reaction mixture it is readily decomposed to formaldehyde. The use of paraformaldehyde makes it possible to reduce the water content of the reaction mixture.

It is also possible to react the phenol with hydrochloric acid and formaldehyde, optionally in the presence of a catalyst, such as zinc chloride or sulfuric acid, thereby forming the corresponding ortho-substituted phenol. This phenol may then be reacted with ammonia when $R_1$ and $R_2$ are both hydrogen or an amine when no more than one of $R_1$ and $R_2$ is hydrogen to form an aminomethyl phenol of the invention.

Phenols which can be used in the manufacture of the preferred class of aminomethyl phenols of the invention have the general formula:

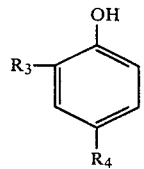

In the above formula, $R_3$ and $R_4$ are as above. Exemplary phenols include ortho- or para-nonyl phenol, ortho- and para-octyl phenyl, xylenol, ortho- and para-didodecyl phenol, ortho- and para-dinonyl phenol, and ortho- and para-dioctyl phenol.

Suitable amines have the groups $R_1$ and $R_2$ as defined above, including, for instance, methylamine, dimethylamine, ethylamine, diethylamine, propylamine, dipropylamine, N-methylethylamine, butylamine, dibutylamine, isobutylamine, diisobutylamine, hexylamine, dihexylamine, cyclohexylamine, dicyclohexylamine, octylamine, dioctyl amine, 2-ethylhexylamine, di-2-ethylhexylamine, pyrrolidine and piperidine.

The following Examples illustrate the preparation of o-N-substituted aminomethyl phenols in accordance with the invention:

EXAMPLE A

At room temperature 65.3 g methylamine as a 40% aqueous solution was added to 277.2 g dinonyl phenol. To this mixture 72.3 g of a 35% aqueous for maldehyde solution was added gradually, resulting in a weak exothermic reaction. After all the formaldehyde had been added, the temperature was brought to about 80° C., and the reaction mixture then was held at this temperature for sixteen hours with stirring. The organic phase then was separated from the water phase, and dissolved in petroleum ether. The petroleum ether solution was washed with water, dried, and titrated to determine the total nitrogen content, the content of secondary nitrogen and the content of primary nitrogen. The titration showed a total of 81% of the theoretical nitrogen corresponding to 2-N-methyl-aminomethyl-4,6-dinonyl-phenol, all of the nitrogen being secondary. IR spectrophotometric analysis confirmed the presence of this compound.

EXAMPLE B

At room temperature 346 g dinonyl phenol as a 40% aqueous solution was added to 118 g dimethylamine. To this mixture 85 g of a 37% aqueous formaldehyde solution was added gradually, resulting in a weak exothermic reaction. After all the formaldehyde had been added, the temperature was brought to 80° C., and the reaction mixture held at this temperature for four hours with stirring. The organic phase was then separated from the aqueous phase, and dissolved in petroleum ether. The solution was washed with water, dried, and titrated with respect to the total nitrogen content and the content of secondary nitrogen. Titration showed a total of 99% of the theoretical nitrogen corresponding to 2-N,N-dimethyl-aminomethyl-4,6-dinonyl phenyl. IR spectrophotometric analysis confirmed the presence of this compound.

EXAMPLE C

At room temperature 43 g dicyclohexylamine was added to 258 g dinonyl phenol. To this mixture 75 g of a 35% aqueous formaldehyde solution was added gradually with stirring in an atmosphere of nitrogen gas. A weak exothermic reaction was obtained. After all the formaldehyde had been added, the temperature was brought to 80° C., and the reaction mixture held at this temperature for five hours with stirring. The organic phase was then separated from the aqueous phase and dissolved in petroleum ether. The solution was washed with water, dried, and titrated with respect to total nitrogen content and the content of secondary nitrogen. The titration showed a total of 99% of the theoretical nitrogen corresponding to 2-N,N-dicyclohexyl-aminomethyl-4,6-dinonyl phenol, with no secondary nitrogen. IR spectrophotometric analysis confirmed the presence of this compound.

EXAMPLE D

At room temperature 27.7 g of a 99% diethyl amine was added to 131.4 g dinonyl phenol. Then, 32.7 g formaldehyde in an aqueous 35% solution was added gradually over one hour. The temperature was raised to about 80° C., and the reaction mixture was held at this temperature for five hours with stirring. The organic phase was separated from the aqueous phase, and dissolved in petroleum ether. The solution was washed with water, dried, and titrated with respect to the total nitrogen and the content of secondary nitrogen. The titration showed 100% of the theoretical nitrogen corresponding to 2-N,N-diethyl-aminomethyl-4,6-dinonyl phenol and a secondary nitrogen content of zero percent. IR spectrophotometric analysis confirmed the presence of this compound.

EXAMPLE E

At room temperature 39 g diisobutyl amine was added to 104 g dinonyl phenol. To this mixture, 26 g of a 37% aqueous formaldehyde solution was added gradually over one hour, with stirring, in an atmosphere of nitrogen gas. The temperature was brought to 80° C., and the reaction mixture held at this temperature for five hours with stirring. The organic phase was then separated from the aqueous phase, and dissolved in petroleum ether. The solution was washed with water, dried, and titrated with respect to the total content of nitrogen content and the secondary nitrogen content. The solution showed total nitrogen at 100% of the theoretical corresponding to 2-N,N-diisobutyl-aminoethyl-4,6-dinonyl phenol, and a secondary nitrogen content of zero percent. IR spectrophotometric analysis confirmed the presence of this compound.

The extraction of the metal ions from the organic solution can be carried out using conventional liquid/liquid extraction techniques. An apparatus of the mixer-settler type is preferably used, having a mixing chamber in which the two liquids are intimately mixed with the aid of a stirrer, and a separation chamber in which the liquids are allowed to separate by gravity. Extraction and washing out can be carried out at room temperature, but it may be advantageous to use an elevated temperature, within the range from about 35° to about 70° C.

The organic solvent used to dissolve the ortho-aminomethyl phenol must be water-insoluble, with a solubility in water of less than 10 g per liter, and preferably less than 1 g per liter, at 20° C. It also must be a solvent for the ortho-aminomethyl phenol. In general, the ortho-aminomethyl phenol constitutes from about 1 to about 80%, preferably from about 5 to about 50%, by volume of the organic solvent.

Examples of useful solvents are aliphatic and aromatic hydrocarbons of low viscosity at the extraction temperature, such as a petroleum hydrocarbon fraction with a boiling range corresponding to that of kerosene, and having a sufficiently low flash point to be safe to use. Other examples of useful solvents are polar organic compounds which are water-insoluble, such as phenols, alcohols and ethers, and chlorinated hydrocarbons, such as carbon tetrachloride and perchlorethylene, and mixtures thereof. Thus, for example, mixtures of aliphatic and/or aromatic hydrocarbons with minor amounts of polar compounds such as alcohols, for example, 2-ethylhexanol, can be used to improve phase separation between the aqueous phase and the extracting solution phase, and/or to improve the solubility of the ortho-aminomethyl phenol in the organic solvent phase.

The process and the extracting solutions in accordance with the invention are capable of selectively extracting polyvalent metal cations such as lead, cadmium and zinc, from aqueous chlorine-containing solutions. Chromium can be selectively extracted from aqueous sulfuric acid solutions, and copper from basic aqueous solutions, such as aqueous alkali.

The following Examples represent preferred embodiments of the process and extracting solutions of the invention:

EXAMPLES 1 to 3

Aqueous hydrochloric acid solutions of ferrous ion $Fe^{++}$, ferric ion $Fe^{+++}$, and plumbous ion $Pb^{++}$, each in amounts of about 0.2 g per liter, were extracted using an extracting solution in accordance with the invention of one of the following three phenols:

Example 1—2-N-methyl-aminomethyl-4,6-dinonyl-phenol
Example 2—2-N,N-dimethyl-aminomethyl-4,6-dinonyl-phenol
Example 3—2-N,N-dicyclohexyl-aminomethyl-4,6-dinonyl phenol.

Each of these phenols was in solution in an amount of about 10% by weight based on the organic solvent, which was composed of 90% kerosene and 10% 2-ethylhexanol. The metal cation concentrations in the organic solution after extraction and in the aqueous solution after extraction were determined, and the distribution factor D calculated. The following results were obtained:

TABLE I

| HCl/Cl⁻ Concentration | | Distribution Factor D | | | | | | | |
|---|---|---|---|---|---|---|---|---|---|
| | | Example 1 | | | Example 2 | | | Example 3 | |
| | | $Fe^{++}$ | $Fe^{+++}$ | $Pb^{++}$ | $Fe^{++}$ | $Fe^{+++}$ | $Pb^{++}$ | $Fe^{++}$ | $Fe^{+++}$ | $Pb^{++}$ |
| HCl | 6.5 M | 0.6 | 97 | 1.1 | 24 | 2 | 0.1 | >100 | >100 | <0.1 |
| HCl | 3.2 M | 0.2 | 0.3 | 3.0 | <0.1 | <0.1 | <0.1 | 39 | 32 | <0.1 |
| HCl | 1.1 M | <0.1 | <0.1 | 2.3 | <.01 | <0.1 | <0.1 | 0.1 | 0.2 | <0.1 |
| Chloride pH | 0.5 | <0.1 | <0.1 | 0.3 | <0.1 | <0.1 | 7 | <0.1 | <0.1 | <0.1 |
| Chloride pH | 1.0 | <0.1 | <0.1 | 6 | <0.1 | <0.1 | 32 | <0.1 | <0.1 | 7 |
| Chloride pH | 2.0 | <0.1 | 0.1 | 39 | <0.1 | <0.1 | 49 | <0.1 | <0.1 | 32 |
| Chloride pH | 2.7 | <0.1 | 3 | 39 | <0.1 | <0.1 | — | <0.1 | 2 | 32 |

It is apparent from the above results that lead can be selectively extracted and separated from iron in aqueous solutions of hydrochloric acid at a pH of about 2.

EXAMPLES 4 to 7

Aqueous hydrochloric acid solutions containing ferrous ion $Fe^{++}$, ferric ion $Fe^{+++}$, cadmium ion $Cd^{++}$, and zinc ion $Zn^{++}$ in amounts of about 0.2 g per liter were extracted with an organic solution composed of 90% kerosene and 10% 2-ethylhexanol containing 10% by weight based on the organic solvent of one of the following phenols:

Example 4—2-N-methyl-aminomethyl-4,6-dinonyl-phenol

Example 5—2-N,N-dicyclohexyl-aminomethyl-4,6-dinonyl-phenol

Example 6—2-N,N-diethyl-aminomethyl-4,6-dinonyl-phenol

Example 7—2-N,N-diisobutyl-aminomethyl-4,6-dinonyl-phenol

The metal ion concentration in the organic solution and in the aqueous solution after the extraction was determined, and the distribution factor D calculated. The following results were obtained:

TABLE II

| HCl/Cl Concentration | | Distribution Factor D | | | | | | | |
|---|---|---|---|---|---|---|---|---|---|
| | | Example 4 | | | | Example 5 | | | |
| | | $Fe^{++}$ | $Fe^{+++}$ | $Cd^{++}$ | $Zn^{++}$ | $Fe^{++}$ | $Fe^{+++}$ | $Cd^{++}$ | $Zn^{++}$ |
| HCl | 6.5 M | 0.6 | 97 | 5 | 5 | >100 | >100 | 14 | 3 |
| HCl | 3.2 M | 0.2 | 0.3 | 7 | 7 | 39 | 32 | 27 | 6 |
| HCl | 1.1 M | <0.1 | <0.1 | 5 | 1.6 | <0.1 | <0.1 | 24 | 1.8 |
| Chloride-pH | 0.5 | <0.1 | <0.1 | 1.3 | 0.1 | <0.1 | <0.1 | 2.4 | <0.1 |
| Chloride-pH | 1.0 | <0.1 | <0.1 | <0.1 | <0.1 | <0.1 | <0.1 | 0.1 | <0.1 |
| Chloride-pH | 2.0 | <0.1 | 0.1 | <0.1 | <0.1 | <0.1 | <0.1 | 0.1 | <0.1 |
| Chloride-pH | 2.7 | <0.1 | 3 | <0.1 | <0.1 | <0.1 | 2 | 0.1 | <0.1 |

| HCl/Cl Concentration | | Example 6 | | | | Example 7 | | | |
|---|---|---|---|---|---|---|---|---|---|
| | | $Fe^{++}$ | $Fe^{+++}$ | $Cd^{++}$ | $Zn^{++}$ | $Fe^{++}$ | $Fe^{+++}$ | $Cd^{++}$ | $Zn^{++}$ |
| HCl | 6.5 M | <0.1 | 64 | 4.5 | 1.4 | <0.1 | 100 | >100 | >100 |
| HCl | 3.2 M | <0.1 | 0.8 | 21 | 6.2 | <0.1 | 64 | >100 | >100 |
| HCl | 1.1 M | <0.1 | <0.1 | 18 | 1.1 | <0.1 | 0.2 | >100 | 96 |
| Chloride-pH | 0.5 | <0.1 | <0.1 | 6.0 | 0.2 | <0.1 | <0.1 | 0.7 | <0.1 |
| Chloride-pH | 1.0 | <0.1 | <0.1 | 0.5 | <0.1 | <0.1 | <0.1 | <0.1 | <0.1 |
| Chloride-pH | 2.0 | <0.1 | <0.1 | <0.1 | <0.1 | <0.1 | <0.1 | <0.1 | <0.1 |
| Chloride-pH | 2.7 | 0.4 | <0.1 | <0.1 | <0.1 | <0.1 | 1.6 | <0.1 | <0.1 |

It is apparent from the above results that these phenol solutions can be used to selectively separate cadmium or zinc from ferrous and ferric ions in aqueous solution. The phenol of Example 7, 2-N,N-diisobutyl-aminomethyl-4,6-dinonyl-phenol, in addition makes it possible to easily separate cadmium and zinc from ferrous or ferric ion containing hydrogen chloride in concentrations within the range from 1 to 6 molar.

EXAMPLE 8

An aqueous solution containing 1 molar ammonium bicarbonate and cupric ion $Cu^{++}$ in an amount of about 0.12 g per liter was extracted with an organic solution in kerosene of 2-methyl-aminomethyl-4,6-dinonyl phenol in an amount of 10% by weight of the kerosene. A distribution value of above 100 was obtained, showing that cupric ion in an alkaline solution can advantageously be extracted with this phenol.

EXAMPLE 9

An aqueous sulfuric acid solution containing chromic ion $Cr^{+++}$, ferrous ion $Fe^{++}$ and ferric ion $Fe^{+++}$ in an amount of 0.2 g per liter was extracted with an organic solution composed of 90% kerosene and 10% 2-ethylhexanol containing 10% by weight 2-N,N-dicyclohexylaminomethyl-4,6-dinonyl-phenol. Distribution factor D was determined, and the following results were obtained:

TABLE III

| | Distribution Factor D | | |
|---|---|---|---|
| pH | $Fe^{++}$ | $Fe^{+++}$ | $Cr^{+++}$ |
| 0.5 | <0.1 | <0.1 | 1.4 |
| 1.0 | <0.1 | <0.1 | 1.3 |

It is apparent from the above results that it is possible to separate chromic ion from both ferrous and ferric ions by extraction with the kerosene/phenol solution from aqueous sulfuric acid solution.

Having regard to the foregoing disclosure, the following is claimed as inventive and patentable embodiments thereof:

1. A process for selectively extracting metal cations from an aqueous solution thereof, which comprises contacting the aqueous solution with a solution in a water-immiscible organic solvent of an ortho-N-substituted aminomethyl phenol which is insoluble in the aqueous solution and contains the active grouping:

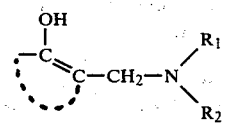

wherein the two carbon atoms within the dashed ring represent part of an aromatic carbocyclic ring; $R_1$ and $R_2$ are selected from the group consisting of hydrogen and hydrocarbon groups having from one to about twelve carbon atoms and including monovalent hydrocarbon groups and bivalent hydrocarbon groups having from about four to about twelve carbon atoms in which $R_1$ and $R_2$ are taken together with the nitrogen to form a heterocyclic ring having from five to about thirteen ring atoms.

2. A process in accordance with claim 1 in which the ortho aminomethyl phenol has the formula:

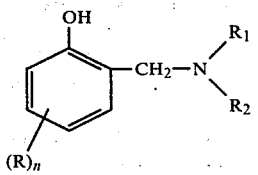

wherein $R_1$ and $R_2$ are as in claim 1; each R is a hydrocarbon group having from one to about twenty-four carbon atoms; and n is a number from 0 to 4.

3. A process in accordance with claim 1 in which the ortho aminomethyl phenol has the general formula:

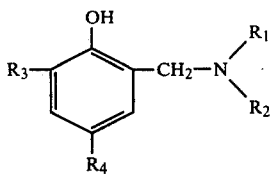

wherein $R_1$ and $R_2$ are as in claim 1, and $R_3$ and $R_4$ are selected from the group consisting of hydrogen and hydrocarbon groups having from one to about forty carbon atoms, the total number of carbon atoms in the hydrocarbon groups $R_3$ and $R_4$ being within the range from about eight to about forty.

4. A process in accordance with claim 3 in which $R_3$ and $R_4$ are each alkyl having at least four carbon atoms.

5. A process in accordance with claim 1 in which $R_1$ and $R_2$ are each alkyl.

6. A process in accordance with claim 1 in which $R_1$ and $R_2$ are each cycloalkyl.

7. A process in accordance with claim 1 in which one of $R_1$ and $R_2$ is hydrogen and one is alkyl.

8. A process in accordance with claim 1 in which $R_1$ and $R_2$ are taken together with the nitrogen to form a heterocyclic ring, in which the amino nitrogen is one ring atom, and $R_1$ and $R_2$ supply the remaining ring atoms, the ring including from five to thirteen ring atoms.

9. A process in accordance with claim 1 in which one of $R_1$ and $R_2$ is hydrogen and the other is a hydrocarbon group.

10. A process in accordance with claim 1 in which both $R_1$ and $R_2$ are hydrocarbon groups.

11. A process according to claim 1 in which the phenol is 2-N-methyl-aminomethyl-4,6-dinonyl-phenol.

12. A process according to claim 1 in which the phenol is 2-N,N-dimethyl-aminomethyl-4,6-dinonyl-phenol.

13. A process according to claim 1 in which the phenol is 2-N,N-dicyclohexyl-aminomethyl-4,6-dinonyl-phenol.

14. A process according to claim 1 in which the phenol is 2-N,N-diethyl-aminomethyl-4,6-dinonyl-phenol.

15. A process according to claim 1 in which the phenol is 2-N,N-diisobutyl-aminomethyl-4,6-dinonyl-phenol.

16. A process in accordance with claim 1 in which the cation being extracted is plumbous cation.

17. A process in accordance with claim 1 in which the cation being extracted is cadmium cation.

18. A process in accordance with claim 1 in which the cation being extracted is zinc cation.

19. A process in accordance with claim 1 in which the cation being extracted is cuprous cation.

20. A process in accordance with claim 1 in which the cation being extracted is chromic cation.

21. A process in accordance with claim 1 in which the organic solvent has a solubility in water of less than 10 g per liter, at 20° C.

22. A process in accordance with claim 1 in which the organic solvent has a solubility in water of less than 1 g per liter, at 20° C.

23. A process in accordance with claim 1 in which the solvent is an aliphatic or aromatic hydrocarbon of low viscosity at the extraction temperature.

24. A process in accordance with claim 23 in which the solvent is a petroleum hydrocarbon fraction with a boiling range corresponding to that of kerosene, and having a low flash point.

25. A process in accordance with claim 1 in which the solvent is a polar organic compound selected from the group consisting of phenols, alcohols, ethers, and chlorinated hydrocarbons.

26. An extractive solvent solution for selectively extracting metal cations from an aqueous solution thereof, comprising a water-immiscible organic solvent and, in solutions therein, an ortho-N-substituted aminomethyl phenol which is insoluble in the aqueous solution and containing the active grouping:

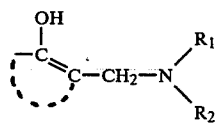

wherein the two carbon atoms within the dashed ring represent part of an aromatic carbocyclic ring; and $R_1$ and $R_2$ are selected from the group consisting of hydrogen and hydrocarbon groups having from one to about twelve carbon atoms and including both monovalent hydrocarbon groups and bivalent hydrocarbon groups having from about four to about twelve carbon atoms, in which $R_1$ and $R_2$ are taken together with the nitrogen to form a heterocyclic ring having from five to about thirteen ring atoms.

27. An extractive solvent solution in accordance with claim 26 in which the ortho aminomethyl phenol has the formula:

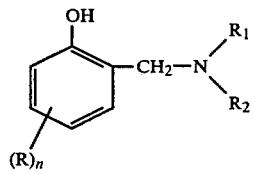

wherein $R_1$ and $R_2$ are as in claim 26; each R is a hydrocarbon group having from one to about twenty-four carbon atoms; and n is a number from 0 to 4.

28. An extractive solvent solution in accordance with claim 26 in which the ortho aminomethyl phenol has the formula:

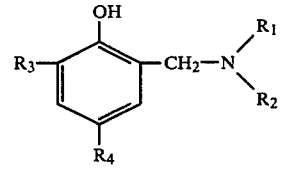

wherein $R_1$ and $R_2$ are as in claim 26, and $R_3$ and $R_4$ are selected from the group consisting of hydrogen and hydrocarbon groups having from one to about forty carbon atoms, the total number of carbon atoms in the hydrocarbon groups $R_3$ and $R_4$ being within the range from about eight to about forty.

29. An extractive solvent solution in accordance with claim 26 in which the ortho-aminomethyl phenol constitutes from 1 to about 80% by volume of the organic solvent.

* * * * *

UNITED STATES PATENT AND TRADEMARK OFFICE
CERTIFICATE OF CORRECTION

PATENT NO. : 4,217,235  Page 1 of 4
DATED : August 12, 1980
INVENTOR(S) : Bengt G. Karlsson It is certified that error appears in the above-identified patent and that said Letters Patent are hereby corrected as shown below:

Column 2, line 45: "it" should be --if--.
Column 3, line 27: "isooctyl 2-ethyl" should be --isooctyl, 2-ethyl--.
Column 4, line 11: "for maldehyde" should be --formaldehyde--.
Column 6, line 29:

Example 1 2-N-methyl-aminomethyl-4,6-dinonyl-phenol should be

Example 1    2-N-methyl-aminomethyl-4,6-dinonyl-phenol--.

Column 6, line 33:

Example 3 2-N,N-dicyclohexyl-aminomethyl-4,6-dinonyl phenol.

should be

Example 3    2-N,N-dicyclohexyl-aminomethyl-4,6-dinonyl phenol--.

UNITED STATES PATENT AND TRADEMARK OFFICE
CERTIFICATE OF CORRECTION

PATENT NO. : 4,217,235

DATED : August 12, 1980

INVENTOR(S) : Bengt G. Karlsson

It is certified that error appears in the above-identified patent and that said Letters Patent are hereby corrected as shown below:

Column 6, Table I, under heading Example 2, $Fe^{++}$

TABLE I

| HCl/Cl⁻ Concentration | | Example 1 | | | Example 2 | | | Example 3 | | |
|---|---|---|---|---|---|---|---|---|---|---|
| | | $Fe^{++}$ | $Fe^{+++}$ | $Pb^{++}$ | $Fe^{++}$ | $Fe^{+++}$ | $Pb^{++}$ | $Fe^{++}$ | $Fe^{+++}$ | $Pb^{++}$ |
| HCl | 6.5 M | 0.6 | 97 | 1.1 | 24 | 2 | 0.1 | >100 | >100 | <0.1 |
| HCl | 3.2 M | 0.2 | 0.3 | 3.0 | <0.1 | <0.1 | <0.1 | 39 | 32 | <0.1 |
| HCl | 1.1 M | <0.1 | <0.1 | 2.3 | <.01 | <0.1 | <0.1 | 0.1 | 0.2 | <0.1 |
| Chloride pH | 0.5 | <0.1 | <0.1 | 0.3 | <0.1 | <0.1 | 7 | <0.1 | <0.1 | <0.1 |
| Chloride pH | 1.0 | <0.1 | <0.1 | 6 | <0.1 | <0.1 | 32 | <0.1 | <0.1 | 7 |
| Chloride pH | 2.0 | <0.1 | 0.1 | 39 | <0.1 | <0.1 | 49 | <0.1 | <0.1 | 32 |
| Chloride pH | 2.7 | <0.1 | 3 | 39 | <0.1 | <0.1 | — | <0.1 | 2 | 32 |

Distribution Factor D should be

TABLE I

| HCl/Cl⁻ Concentration | | Example 1 | | | Example 2 | | | Example 3 | | |
|---|---|---|---|---|---|---|---|---|---|---|
| | | $Fe^{++}$ | $Fe^{+++}$ | $Pb^{++}$ | $Fe^{++}$ | $Fe^{+++}$ | $Pb^{++}$ | $Fe^{++}$ | $Fe^{+++}$ | $Pb^{++}$ |
| HCl | 6.5 M | 0.6 | 97 | 1.1 | 24 | 2 | 0.1 | >100 | >100 | <0.1 |
| HCl | 3.2 M | 0.2 | 0.3 | 3.0 | <0.1 | <0.1 | <0.1 | 39 | 32 | <0.1 |
| HCl | 1.1 M | <0.1 | <0.1 | 2.3 | <0.1 | <0.1 | <0.1 | 0.1 | 0.2 | <0.1 |
| Chloride pH | 0.5 | <0.1 | <0.1 | 0.3 | <0.1 | <0.1 | 7 | <0.1 | <0.1 | <0.1 |
| Chloride pH | 1.0 | <0.1 | <0.1 | 6 | <0.1 | <0.1 | 32 | <0.1 | <0.1 | 7 |
| Chloride pH | 2.0 | <0.1 | 0.1 | 39 | <0.1 | <0.1 | 49 | <0.1 | <0.1 | 32 |
| Chloride pH | 2.7 | <0.1 | 3 | 39 | <0.1 | <0.1 | — | <0.1 | 2 | 32 |

Distribution Factor D

Column 6, line 67 : *Example 4 —2-N-methyl-aminomethyl-4,6-dinonyl-phenol should be Example 4   2-N-methyl-aminomethyl-4,6-dinonyl-phenol

UNITED STATES PATENT AND TRADEMARK OFFICE
CERTIFICATE OF CORRECTION

PATENT NO. : 4,217,235

DATED : August 12, 1980

INVENTOR(S) : Bengt G. Karlsson

It is certified that error appears in the above–identified patent and that said Letters Patent are hereby corrected as shown below:

Column 7, line 1 : Example 5—2-N,N-dicyclohexyl-aminomethyl-4,6-dinonyl-phenol should be Example 5  2-N,N-dicyclohexyl-aminomethyl-4,6-dinonyl-phenol--.

Column 7, line 3 : Example 6—2-N,N-diethyl-aminomethyl-4,6-dinonyl-phenol should be Example 6  2-N,N-diethyl-aminomethyl-4,6-dinonyl-phenol--.

UNITED STATES PATENT AND TRADEMARK OFFICE
CERTIFICATE OF CORRECTION

PATENT NO. : 4,217,235

DATED : August 12, 1980

INVENTOR(S) : Bengt G. Karlsson

Page 4 of 4

It is certified that error appears in the above-identified patent and that said Letters Patent are hereby corrected as shown below:

Column 7, line 5 :   Example 7—2-N,N-diisobutyl-aminomethyl-4,6-cino-
                     nyl-phenol should be Example 7   2-N, N-diisobutyl-aminomethyl-
4, 6-dinonyl-phenol--.

Column 7, line 45 :   insert "N-" after "2".

Signed and Sealed this

First Day of September 1981

[SEAL]

Attest:

Attesting Officer

GERALD J. MOSSINGHOFF

Commissioner of Patents and Trademarks